United States Patent
Lee et al.

(10) Patent No.: US 8,427,526 B2
(45) Date of Patent: Apr. 23, 2013

(54) BILLBOARD DISPLAY SYSTEM AND METHOD

(75) Inventors: Hou-Hsien Lee, Taipei Hsien (TW);
Chang-Jung Lee, Taipei Hsien (TW);
Chih-Ping Lo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 354 days.

(21) Appl. No.: 12/910,812

(22) Filed: Oct. 24, 2010

(65) Prior Publication Data
US 2012/0002020 A1    Jan. 5, 2012

(30) Foreign Application Priority Data
Jun. 30, 2010   (TW) .............................. 99121361 A (51) Int. Cl.
*H04N 13/04*   (2006.01)
(52) U.S. Cl.
USPC .............................................. 348/46; 348/51

(58) Field of Classification Search .................... 348/46, 348/51
See application file for complete search history.

(56) References Cited

U.S. PATENT DOCUMENTS

| | | | |
|---|---|---|---|
| 2002/0008692 A1* | 1/2002 | Omura et al. ................. 345/173 |
| 2005/0080671 A1* | 4/2005 | Giraud et al. .................... 705/14 |
| 2009/0006201 A1* | 1/2009 | Faseler, Jr. ...................... 705/14 |
| 2012/0182392 A1* | 7/2012 | Kearns et al. ................... 348/46 |

* cited by examiner

*Primary Examiner* — Sath V Perungavoor
*Assistant Examiner* — Jeffery Williams
(74) *Attorney, Agent, or Firm* — Altis Law Group, Inc.

(57) ABSTRACT

A billboard display method includes: capturing images of a scene near the screen by a number of time-of-flight (TOF) cameras, building three dimension (3D) models of the scene according to the images and the data about distances between points in the scene and the TOF cameras; checking the 3D models to determine whether there is a person nearby the screen; checking the 3D models to determine a relative position of the person to the screen upon the condition that there is a person nearby the screen; and controlling a media to be shown at a corresponding position of the screen according to the relative position of the person to the screen.

11 Claims, 10 Drawing Sheets

BILLBOARD DISPLAY SYSTEM AND METHOD

CROSS-REFERENCE TO RELATED APPLICATIONS

Relevant subject matter is disclosed in two co-pending U.S. patent applications (application Ser. Nos. 12/908,010 and 12/914,923) having the same titles, which are assigned to the same assignees as this patent application.

BACKGROUND

1. Technical Field

The present disclosure relates to a billboard display system and a billboard display method.

2. Description of Related Art

Most conventional columnar electronic billboards cannot change the position of the advertisement being displayed according to the location of an individual, this restricts the coverage of the advertisement. Therefore there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
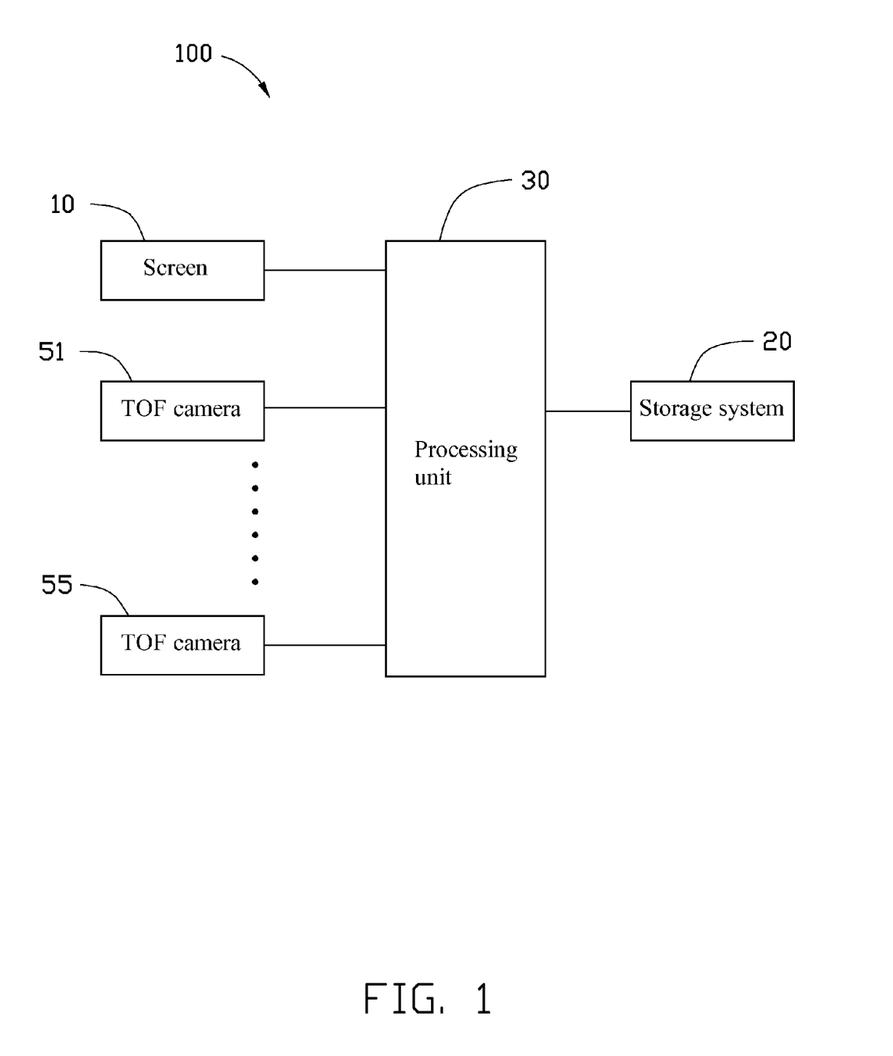
FIG. 1 is a block diagram of an exemplary embodiment of a billboard display system, the billboard display system includes a storage system and five TOF cameras.
Figure 2:
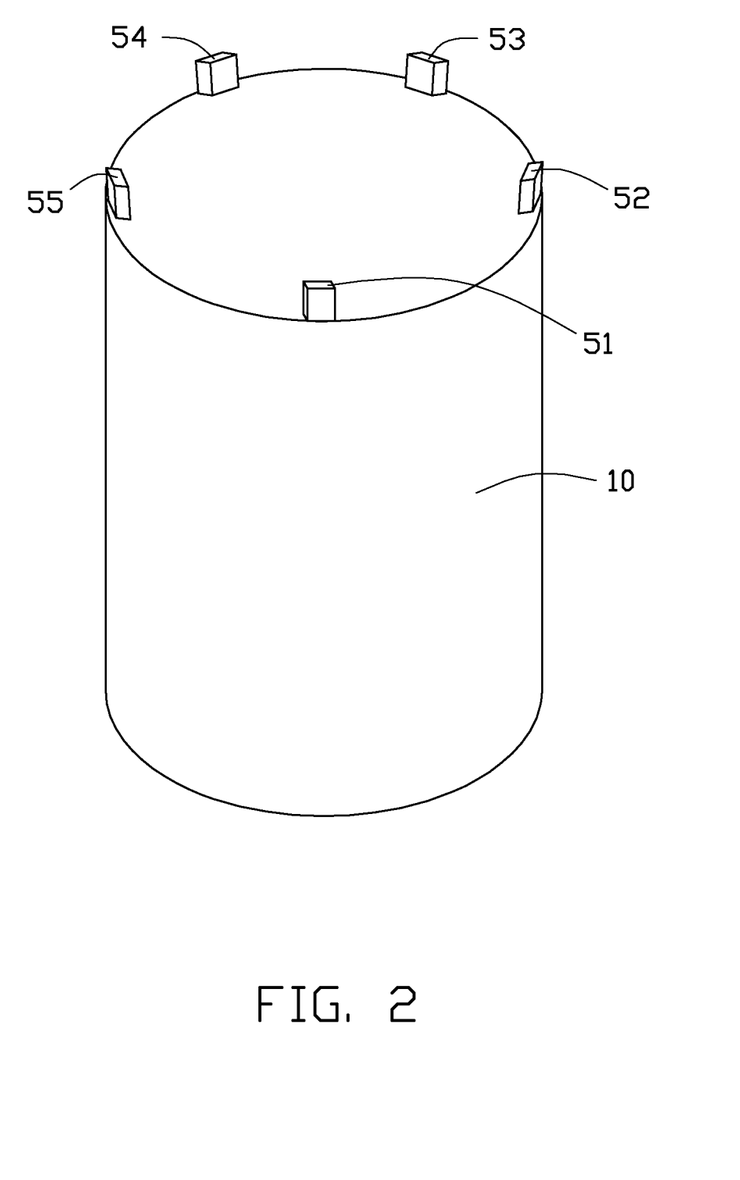
FIG. 2 is a schematic diagram of the billboard display system of FIG. 1.

Referring to FIGS. 1 and 2, an exemplary embodiment of a billboard display system 100 includes a screen 10, a storage system 20, a processing unit 30, and five time-of-flight (TOF) cameras 51-55. In other embodiments, the billboard display system 100 may include more or less than five TOF cameras.

The screen 10 is a columnar electronic billboard. The TOF cameras 51-55 are equidistantly mounted on a top edge of the screen 10 to form a circle. Each of the TOF cameras 51-55 captures images of an area near the screen 10 so a 360 degree view can be captured and examined, and transmits the images to the processing unit 30.

Figure 3:
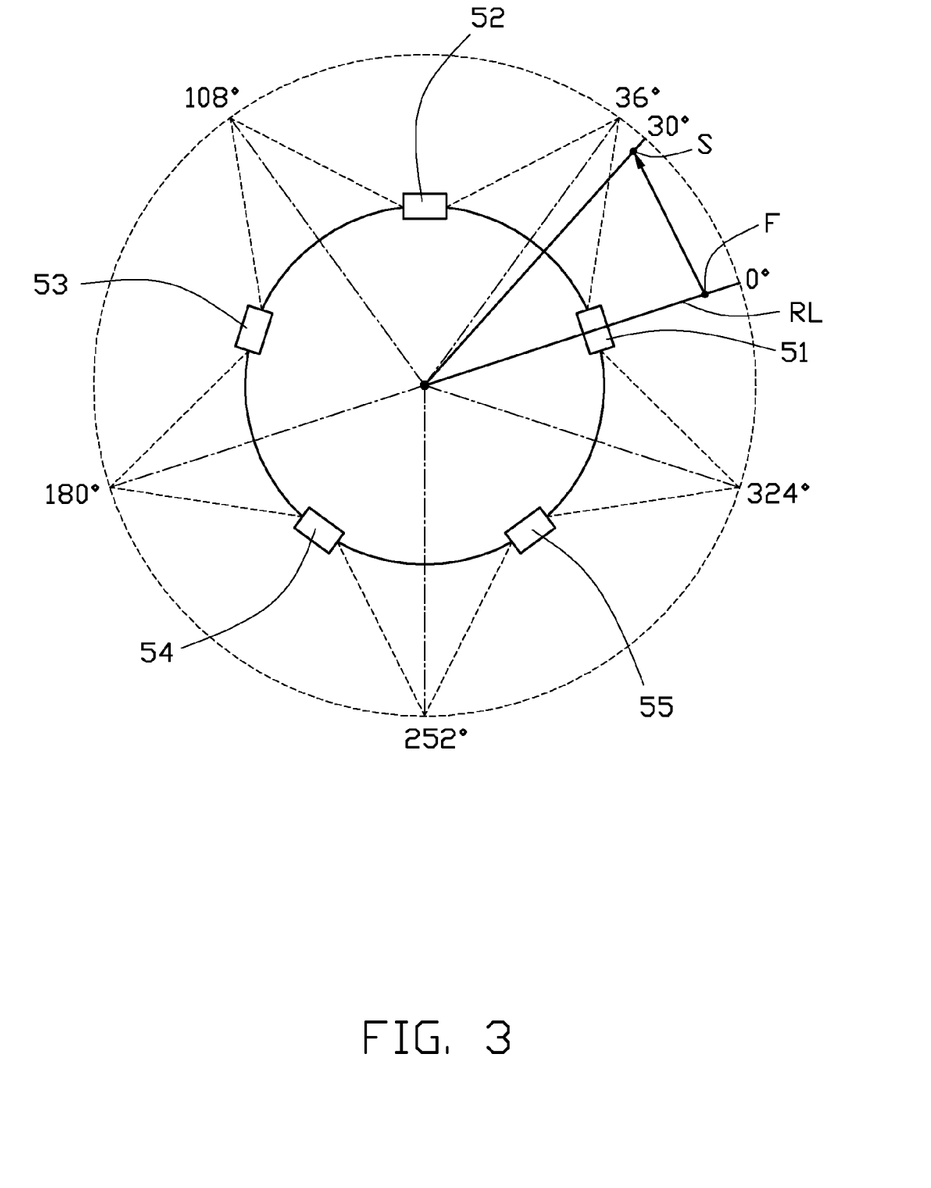
FIG. 3 is a schematic diagram of the billboard display system of FIG. 1 in a working state.

Referring to FIG. 3, in the embodiment, each of the TOF cameras 51-55 captures an image of a fifth area near the screen 10 so that up to a 72 degree view can be captured by one TOF camera. In other words, the top edge of the screen 10 is divided into five parts. Each of the TOF cameras 51-55 is mounted on a center of one part of the top edge of the screen 10 (see FIG. 2).

Each of the TOF cameras 51-55 is a camera system that creates distance data between a plurality of points near the screen 10 and the TOF camera. When the TOF camera shoots a scene near the screen 10, the TOF camera sends radio frequency (RF) signals. The RF signals return to the TOF camera when the RF signals meet an object, such as a lamppost in the scene. As a result, distance data can be obtained according to time differences between sending and receiving the RF signals from the TOF camera.

Figure 4:
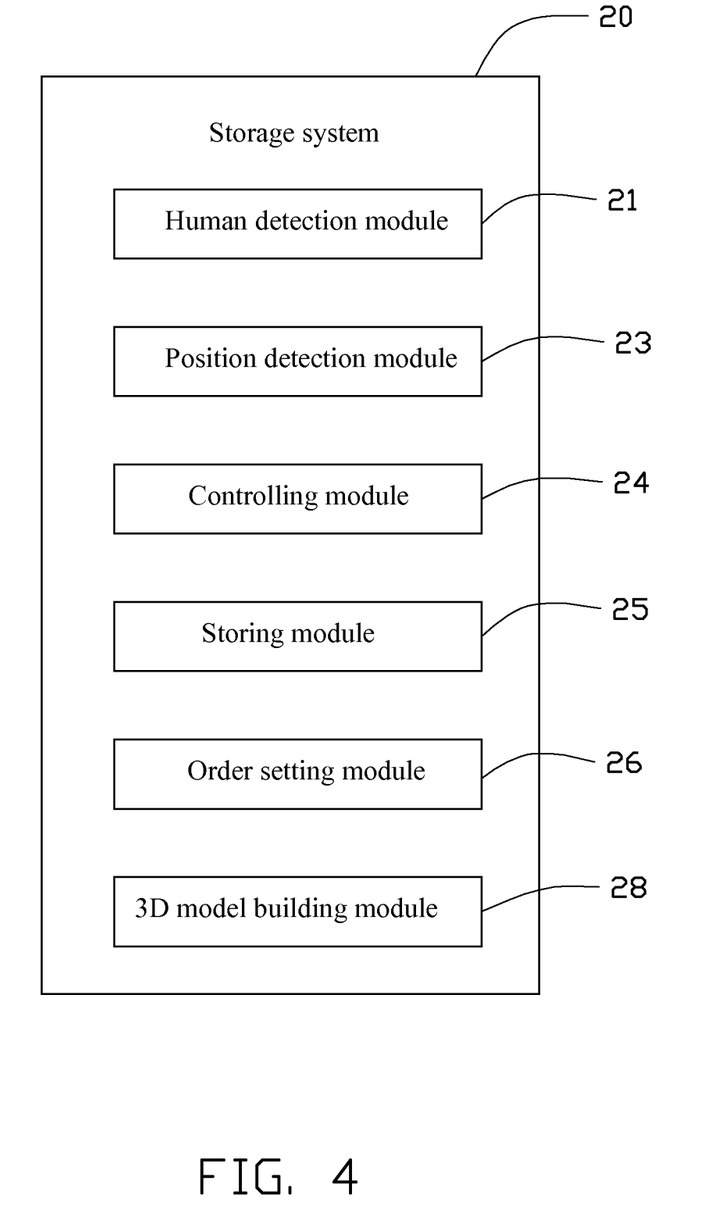
FIG. 4 is a block diagram of the storage system of FIG. 2.

Referring to FIG. 4, the storage system 20 includes a three dimension (3D) model building module 28, a human detection module 21, a position detection module 23, a controlling module 24, a storing module 25, and an order setting module 26 which may include one or more computerized instructions and are executed by the processing unit 30 (see FIG. 1).

The storing module 25 stores an advertisement image. In the embodiment, the image is a clock for sale.

The 3D model building module 28 builds a 3D model of the scene near the screen 10 according to each image captured by the TOF cameras 51-55 and distances between a plurality of points in the scene and the TOF camera. In the embodiment, according to the distance data, the plurality of points in the scene has coordinates relative to the TOF camera. The 3D model building module 28 can builds a 3D mathematical model according to the coordinates of the plurality of points in the image. The 3D mathematical model can be regarded as the 3D model of the area near the screen 10.

The human detection module 21 checks the 3D models obtained by the 3D model building module 28 to determine whether there is a person nearby the screen 10. The human detection module 150 may use known human recognition technology when analyzing the 3D models.

The position detection module 23 checks the 3D models determined to contain a person to determine a relative position of the person to the screen 10. In the embodiment, it may be understood that the relative position of the person to the screen 10 can be regarded as the angle between a line from a center of the person to the screen 10 and a reference line. In the embodiment, the reference line is a line from the center of the screen 10 through a center of the camera 51 marked "RL" in FIG. 3. We can consider the RL to be a 0 degree line extending from the screen 10. And so it follows that we can consider there are many lines extending from the screen, one for each of 360 degrees and that a person in view of any of the cameras will occupy a position on one of those lines.

Figure 5:
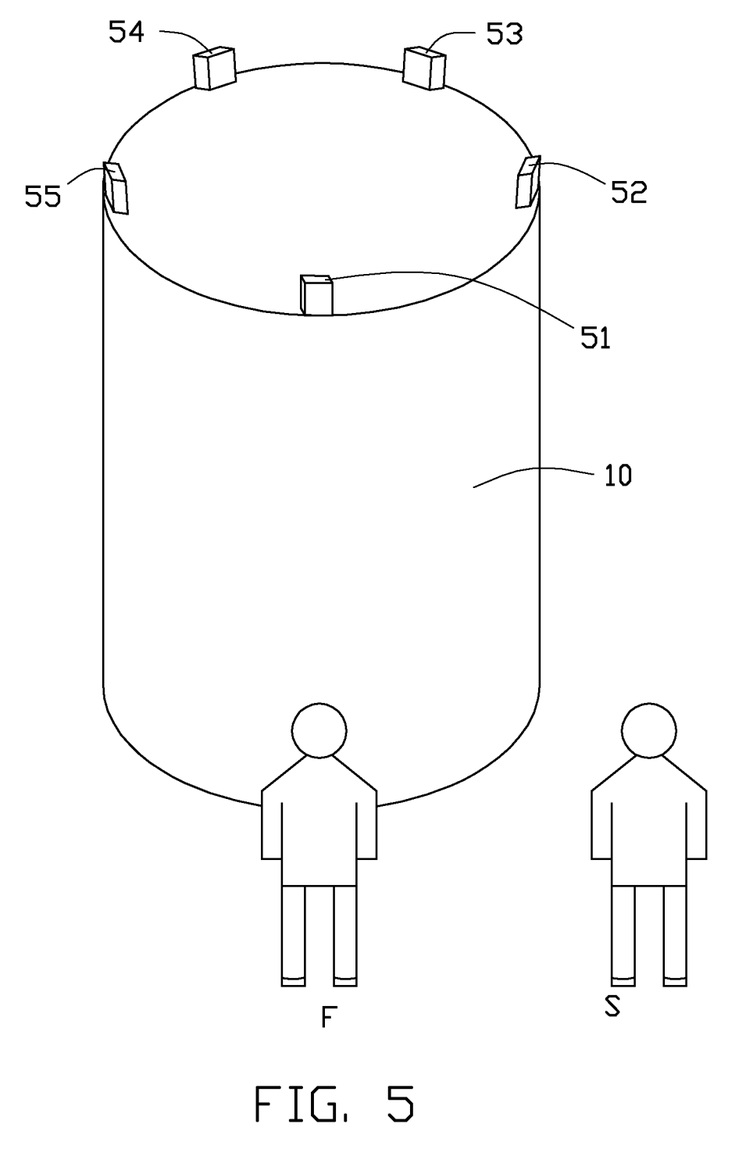
FIG. 5 is another schematic diagram of the billboard display system of FIG. 1 in a working state.

Referring to FIG. 5, in the embodiment, when a person is located at a position F in view of the camera 51 as shown in FIGS. 3 and 5, a line from the center of the person to the center of the screen 10 is coincident with the reference line, namely the angle between the line from the center of the person to the center of the screen 10 and the reference line is 0 degrees. Therefore the relative position of the person to the screen 10 is on the 0 degree line. As a result, when the 3D model obtained by the 3D model building module 28 according to the TOF camera 51 is determined to contain a person, the relative position of the person to the screen 10 is within a range from the 324 degree line to the 36 degree line in an anti-clockwise direction going through 0 degrees (see FIG. 3). When the 3D model obtained by the 3D model building module 28 according to the TOF camera 52 is determined to contain a person, the relative position of the person to the screen 10 is within a range from the 36 degree line to the 108 degree line in an anti-clockwise direction. When the 3D model obtained by the 3D model building module 28 according to the TOF camera 53 is determined to contain a person, the relative position of the person to the screen 10 is within a range from the 108 degree line to the 180 degree line in an anti-clockwise direction. When the 3D model obtained by the 3D model building module 28 according to the TOF camera 54 is determined to contain a person, the relative position of the person to the screen 10 is within a range from the 180 degree line to the 252 degree line in an anti-clockwise direction. When the 3D model obtained by the 3D model building module 28 according to the TOF camera 55 is determined to contain a person, the relative position of the person to the screen 10 is within a range from the 252 degree line to the 324 degree line in an anti-clockwise direction.

Figure 6:
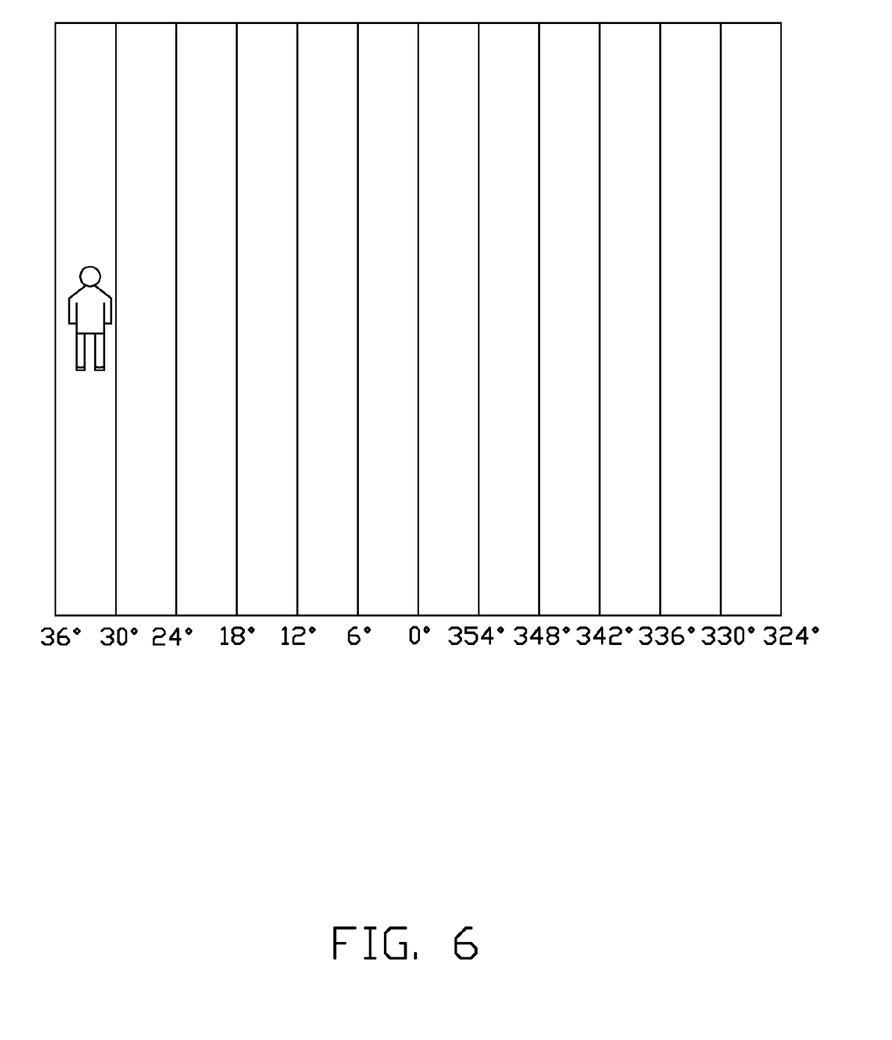
FIG. 6 is a schematic diagram of an image captured by one of the cameras of FIG. 1.

Referring to FIG. 6, the 3D model obtained by the 3D model building module 28 corresponding to the image captured by the TOF camera 51 is divided into twelve parts. Each part indicates a possible relative position of the person to the screen 10. For example, when the person stands at a position S as shown in FIGS. 3 and 5, the person 3D model obtained by the 3D model building module 28 corresponding to the image captured by the TOF camera 51 is in the first part on the left. As a result, the relative position of the person to the screen 10 is within a range from the 30 degree line to the 36 degree line.

Figure 7:
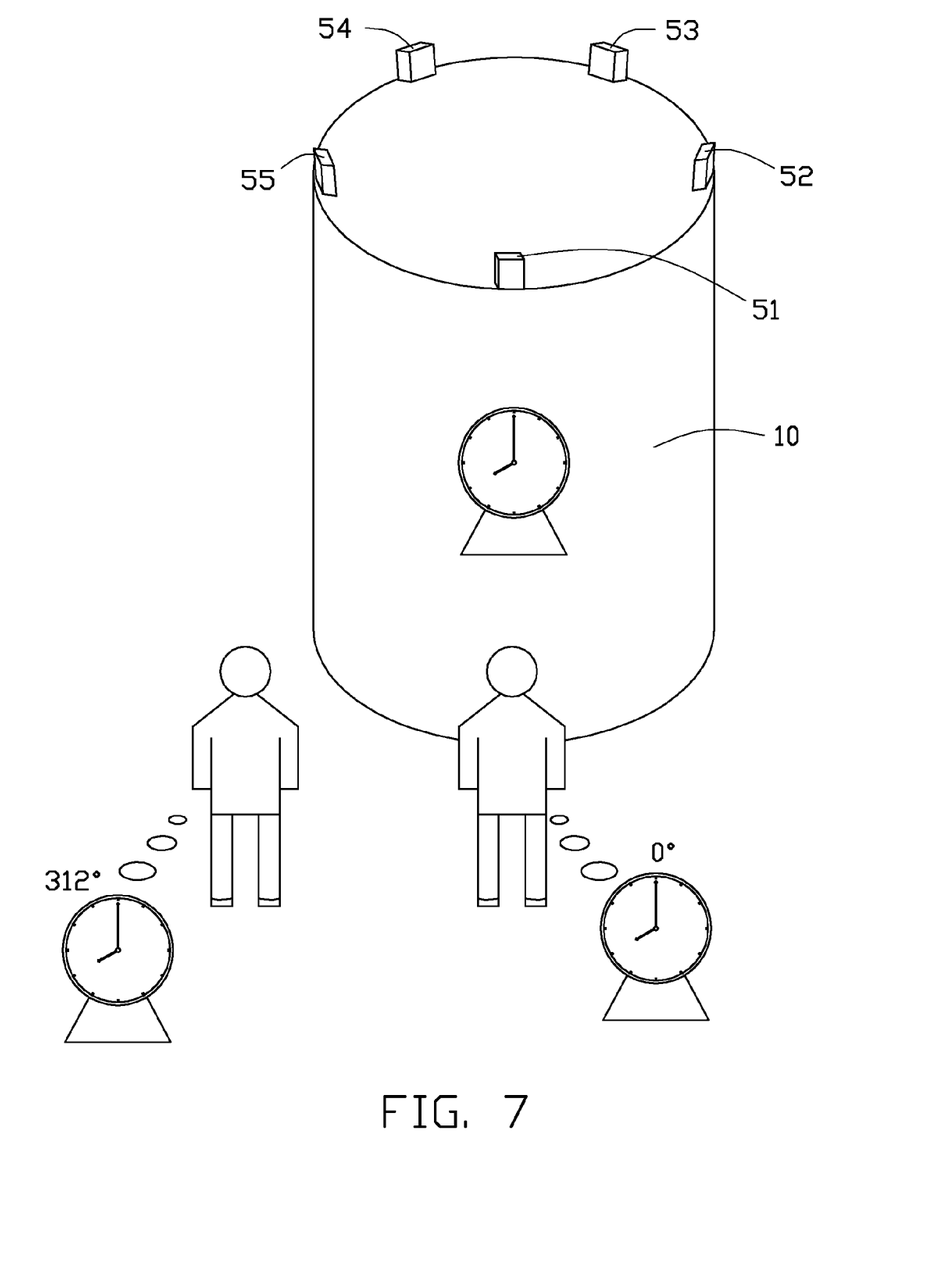
FIG. 7 is a schematic diagram of the billboard display system displaying an image according to a position of a person.

Referring to FIG. 7, the controlling module 24 controls the image stored in the storing module 25 to be shown at a corresponding position of the screen 10 according to the relative position of the person to the screen 10. As a result, the person can watch the image on the screen 10 wherever the person stands at nearby the screen 10.

Figure 8:
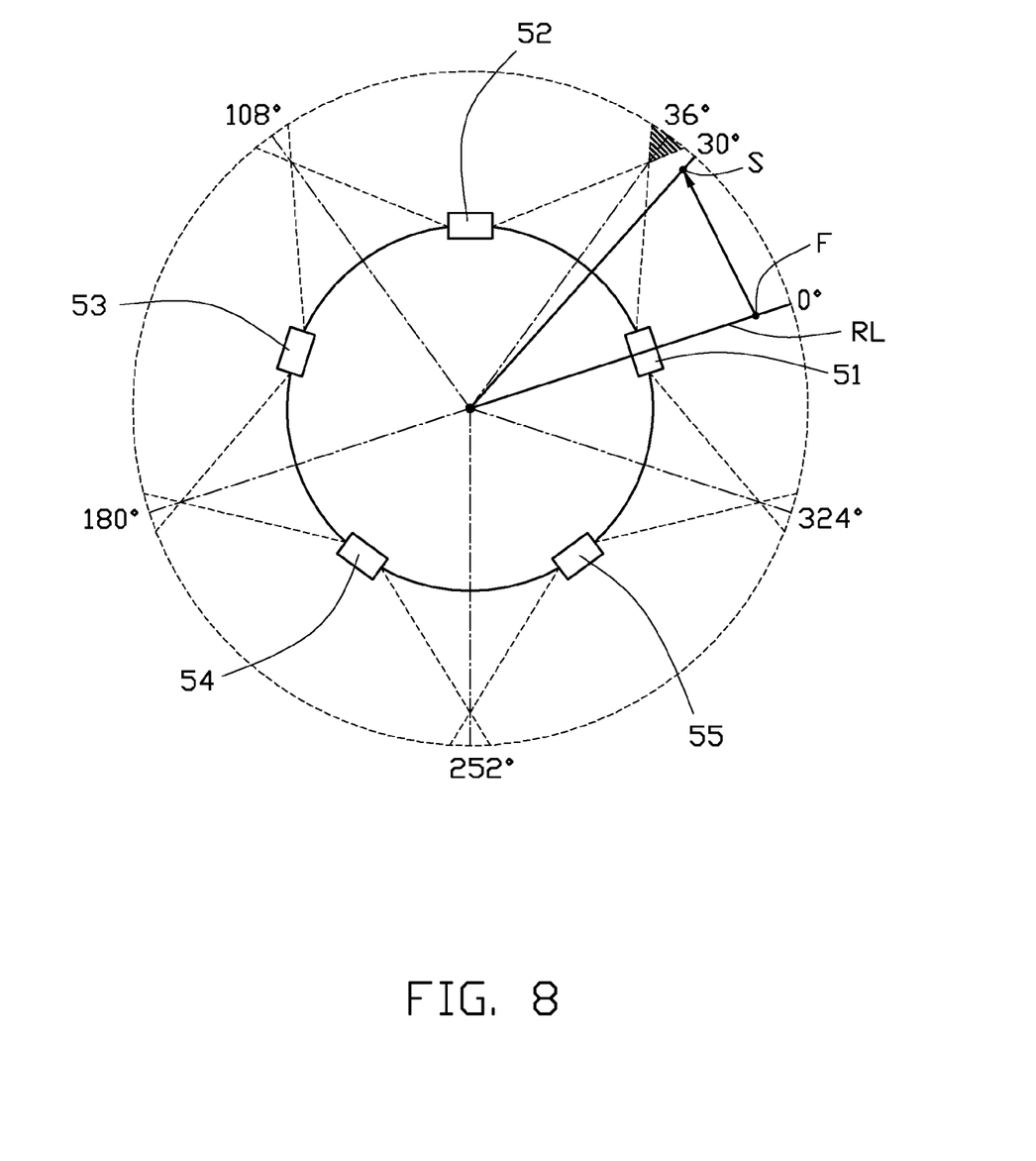
FIG. 8 is a schematic diagram of another embodiment of a billboard display system in a working state.

Referring to FIG. 8, in other embodiments, if two adjacent TOF cameras, such as the TOF cameras 51 and 52, can capture the images of the person, the person 3D model is in both of the 3D models obtained by the 3D model building module 28 corresponding to images captured by the TOF cameras 51 and 52. For example, when the person stands in the shaded region shown in FIG. 8, the TOF cameras 51 and 52 can capture the person. At this time, the relative position of the person to the screen 10 can be within a range from 0 degrees to 36 degrees or within a range from 36 degrees to 108 degrees in an anti-clockwise direction. At this condition, operators can set the rules to make the position detection module 23 determine that the relative position of the person to the screen 10 is within a range from 0 degrees to 36 degrees in an anti-clockwise direction or within a range from 36 degrees to 108 degrees in an anti-clockwise direction. If the position detection module 23 determines that the relative position of the person to the screen 10 is within a range from 0 degrees to 36 degrees in an anti-clockwise direction, the position detection module 23 further determines the relative position of the person to the screen 10 according to the image captured by the TOF camera 51.

The order setting module 26 sets an order that the position detection module 23 detects the relative positions of two or more persons to the screen 10 when there are two or more persons near the screen 10.

Figure 9:
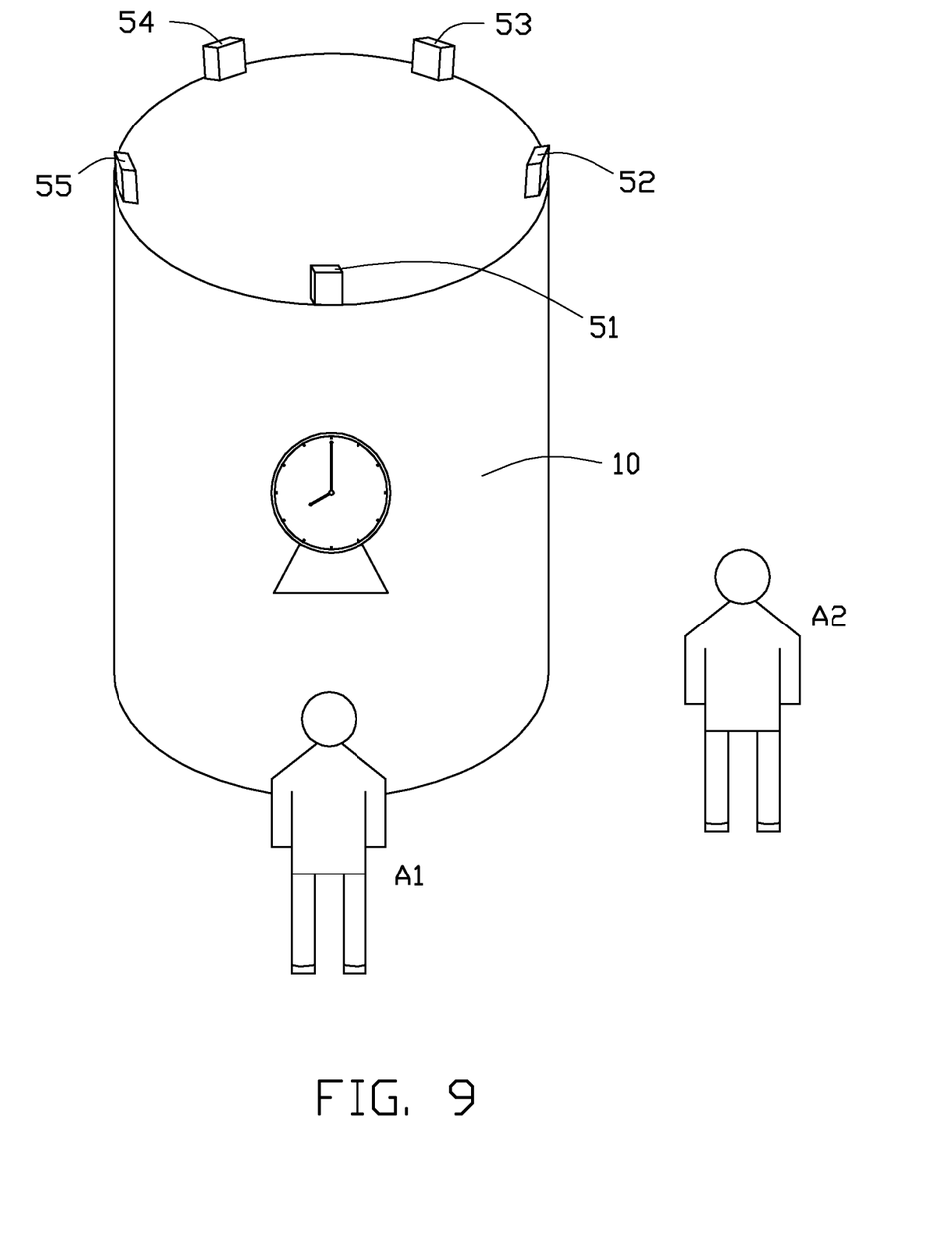
FIG. 9 is a schematic diagram of the display system of FIG. 1 when there are two persons.

Referring to FIG. 9, when two persons A1 and A2 stand near the screen 10, the order setting module 26 sets the order that the position detection module 23 detects the relative positions of the two persons A1 and A2 to the screen 10 according to the time the person being near the screen 10. For example, when a first person A1 stands near the screen 10 early, the position detection module 23 detects the relative position of the first person A1 to the screen 10. After a period of time, a second person A2 stands near the screen 10, the order setting module 26 controls the position detection module 23 not to detect the relative position of the second person A2 to the screen 10. Until the first person A1 leaves, namely the first person 3D model is not in the 3D model corresponding to the images captured by the TOF cameras 51-55, the order setting module 26 controls the position detection module 23 to detect the relative position of the second person A2 to the screen 10.

When the two persons A1 and A2 are standing near the screen 10 at the same time, the order setting module 26 can set the order according to a serial number of each TOF camera. For example, the TOF camera 51 captures the image of the first person A1, and the TOF camera 52 captures the image of the second person A2. The order setting module 26 controls the position detection module 23 detects the relative position of the first person A1 to the screen 10. Until the first person A1 leaves, namely the 3D models corresponding to the images captured by the TOF cameras 51-55 are determined to not contain the first person, the order setting module 26 controls the position detection module 23 to detect the relative position of the second person A2 to the screen 10.

Figure 10:
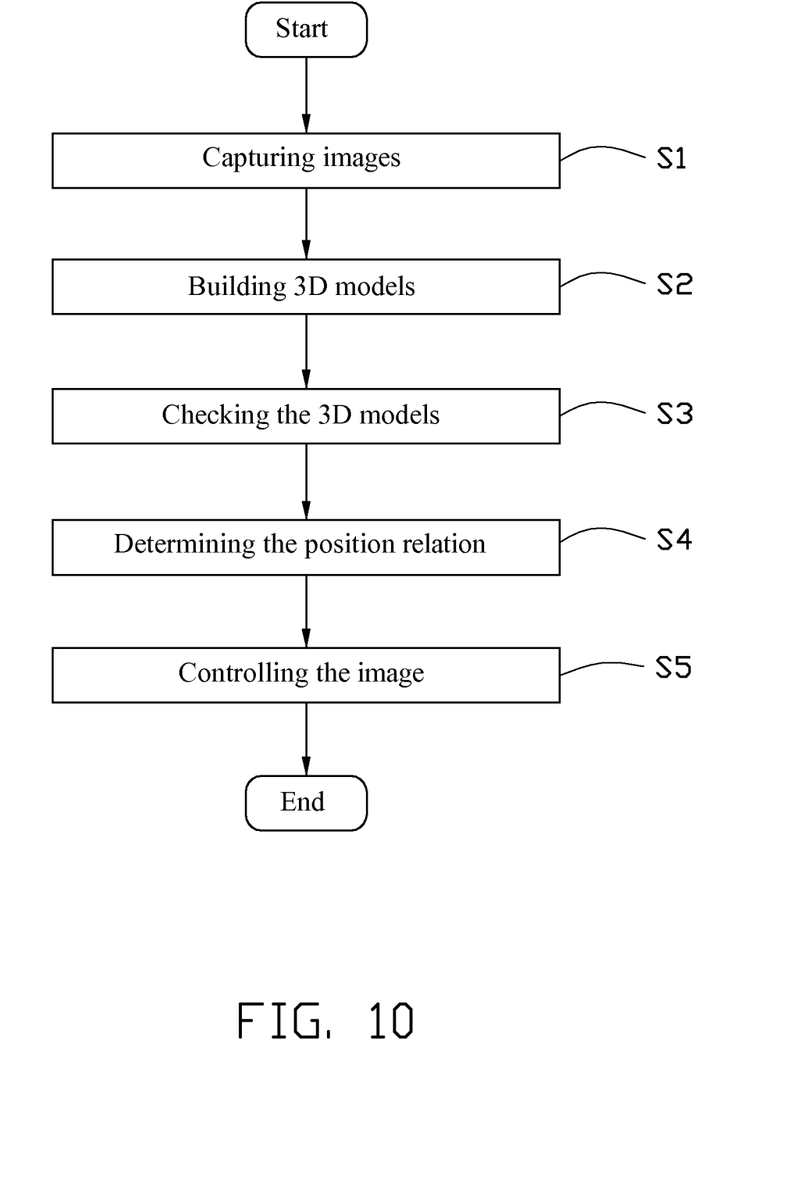
FIG. 10 is a flowchart of an exemplary embodiment of a billboard display method.

Referring to FIG. 10, an exemplary embodiment of a billboard display method includes the following steps.

In step S1, the TOF cameras 51-55 capture images of the scene near the screen 10. The TOF cameras 51-55 further gather data about distances between a plurality of points in the scene and the corresponding TOF camera. Each of the TOF cameras 51-55 is a camera system that gathers data about distances between the plurality of points in the scene and the TOF camera. When the TOF camera is recording the scene, the TOF camera emits RF signals. The RF signals are reflected back to the TOF camera when the signals meet a feature in the scene, such as a desk. As a result, the data about distances can be obtained according to time differences between sending and receiving the RF signals of the TOF camera.

In step S2, the 3D model building module 28 builds 3D models of the scene near the screen 10 according to the images captured by the TOF cameras 51-55 and the data about distances between the plurality of points in the scene and the TOF cameras 51-55. In the embodiment, according to the data about distances between a plurality of points in the scene near the screen 10 and the TOF cameras 51-55, the plurality of points in the scene has coordinates relative to the TOF cameras 51-55. The 3D model building module 28 can obtain 3D mathematical models according to the coordinates of the plurality of points and the images. The 3D mathematical models can be regarded as the 3D models of the scene near the screen 10.

In step S3, the human detection module 21 detects the 3D models obtained by the 3D model building module 28 to determines whether there is a person nearby the screen 10. If one of the 3D models corresponding to the images captured by the TOF cameras 51-55 is determined to contain a person, the process flows to step S4. If each of the 3D models corresponding to the images captured by the TOF cameras 51-55 is determined to contain no person, the process returns to step S1.

In step S4, the position detection module 23 detects the 3D models determined to contain a person to determine the relative position of the person to the screen 10.

In step S5, the controlling module 24 controls the image stored in the storing module 25 to be shown at a corresponding position of the screen 10 according to the relative position of the person of the screen 10.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A billboard display system comprising:
   a screen;
   a plurality of time-of-flight (TOF) cameras to capture images of a scene near the screen and obtain data about distances between a plurality of points in the scene and the TOF cameras;
   a processing unit connected between the TOF cameras and the screen; and
   a storage system connected to the processing unit and storing a plurality of programs to be executed by the processing unit, wherein the storage system comprises:
      a three dimension (3D) model building module to build 3D models of the scene according to the images of the scene and the data about distances between the plurality of points in the scene and the TOF cameras;
      a human detection module to check the 3D models obtained by the 3D model building module to determine whether there is a person near the screen;
      a position detection module to check the 3D models to determine a relative position of the person on the screen when there is a person near the screen;
      an order setting module to set an order that the position detection module detects the relative positions of two or more persons on the screen when there are two or more persons near the screen; and
      a controlling module to control a media to be shown at a corresponding position of the screen according to the relative position on the person of the screen.

2. The billboard display system of claim 1, wherein the screen is a columnar electronic billboard.

3. The billboard display system of claim 2, wherein the plurality of TOF cameras are equidistantly mounted on a top edge of the screen.

4. The billboard display system of claim 1, wherein the position detection module sets the order that the position detection module detects the relative positions of two or more persons on the screen according to the time the persons being near the screen.

5. The billboard display system of claim 1, wherein the position detection module sets the order that the position detection module detects the relative positions of two or more persons on the screen according to a serial number of each TOF camera.

6. A billboard display method comprising:
   capturing images of a scene near a screen by a plurality of time-of-flight (TOF) cameras;
   building three dimension (3D) models of the scene according to the images and data about distances between the plurality of points in the scene and the TOF cameras;
   checking the 3D models to determine whether there is a person near the screen;
   checking the 3D models to determine a relative position of the person on the screen upon the condition that there is a person near the screen;
   setting an order that detects the relative positions of two or more persons on the screen when there are two or more persons near the screen according to the time the persons being near the screen; and
   controlling a media to be shown at a corresponding position of the screen according to the relative position of the person on the screen.

7. The billboard display method of claim 6, wherein the screen is a columnar electronic billboard.

8. The billboard display method of claim 7, wherein the plurality of TOF cameras are equidistantly mounted on a top edge of the screen.

9. A billboard display method comprising:
   capturing images of a scene near a screen by a plurality of time-of-flight (TOF) cameras;
   building three dimension (3D) models of the scene according to the images and data about distances between the plurality of points in the scene and the TOF cameras;
   checking the 3D models to determine whether there is a person near the screen;
   checking the 3D models to determine a relative position of the person on the screen upon the condition that there is a person near the screen;
   setting an order that detects the relative positions of two or more persons on the screen when there are two or more persons near the screen according to a serial number of each TOF camera; and
   controlling a media to be shown at a corresponding position of the screen according to the relative position of the person on the screen.

10. The billboard display method of claim 9, wherein the screen is a columnar electronic billboard.

11. The billboard display method of claim 9, wherein the plurality of TOF cameras are equidistantly mounted on a top edge of the screen.

* * * * *